(12) United States Patent
Hibbard

(10) Patent No.: US 8,931,987 B2
(45) Date of Patent: Jan. 13, 2015

(54) CARGO AREA DIVIDER ASSEMBLY

(71) Applicant: Edward Hibbard, Conroe, TX (US)

(72) Inventor: Edward Hibbard, Conroe, TX (US)

( * ) Notice: Subject to any disclaimer, the term of this patent is extended or adjusted under 35 U.S.C. 154(b) by 0 days.

(21) Appl. No.: 14/101,524

(22) Filed: Dec. 10, 2013

(65) Prior Publication Data

US 2014/0169906 A1    Jun. 19, 2014

Related U.S. Application Data

(60) Provisional application No. 61/739,506, filed on Dec. 19, 2012.

(51) Int. Cl.
*B60P 7/135* (2006.01)
(52) U.S. Cl.
CPC ..................... *B60P 7/135* (2013.01)
USPC ........................................................ 410/121
(58) Field of Classification Search
USPC ............... 410/121, 122, 127, 129, 143, 151; 296/24.4, 37.6; 224/403, 404; 220/530, 220/534
See application file for complete search history.

(56) References Cited

U.S. PATENT DOCUMENTS

| | | | | |
|---|---|---|---|---|
| 4,650,383 A * | 3/1987 | Hoff | ............................ | 410/149 |
| 4,889,253 A * | 12/1989 | Schmulian et al. | ............ | 220/551 |
| 5,104,269 A * | 4/1992 | Hardison | ....................... | 410/149 |
| D326,076 S * | 5/1992 | Wiese | .......................... | D12/414 |
| 5,265,993 A * | 11/1993 | Wayne | .......................... | 410/129 |
| 5,697,742 A * | 12/1997 | House | ............................ | 410/127 |
| D394,640 S * | 5/1998 | Pestone | ......................... | D12/414 |
| 5,769,580 A * | 6/1998 | Purvis | ............................ | 410/151 |
| 6,073,794 A * | 6/2000 | Bidot | ............................ | 220/529 |
| 6,109,847 A * | 8/2000 | Patel et al. | ..................... | 410/129 |
| 6,138,883 A * | 10/2000 | Jackson et al. | ................ | 224/404 |
| 6,206,624 B1 | 3/2001 | Brandenburg | | |
| 6,227,781 B1 * | 5/2001 | Smith et al. | .................... | 410/151 |
| 6,238,154 B1 * | 5/2001 | DaPrato | ......................... | 410/151 |
| 6,267,427 B1 | 7/2001 | Ziehl | | |
| 6,419,434 B1 * | 7/2002 | Rahn | ............................. | 410/151 |
| 6,505,764 B2 * | 1/2003 | Vining et al. | ................. | 224/405 |
| 6,582,169 B1 * | 6/2003 | Cano-Rodriguez et al. | .. | 410/128 |
| 6,629,807 B2 | 10/2003 | Bernardo | | |
| 6,644,712 B1 * | 11/2003 | Rafi-Zadeh | .................. | 296/37.8 |
| 6,688,821 B1 * | 2/2004 | Snyder | .......................... | 410/140 |
| 6,827,533 B2 * | 12/2004 | Cano-Rodriguez et al. | .. | 410/128 |
| 6,830,418 B2 * | 12/2004 | Keramidis | ....................... | 410/38 |
| 7,163,119 B2 * | 1/2007 | Besselman | ..................... | 220/551 |
| 7,246,731 B1 * | 7/2007 | Matherne, Sr. | ................ | 224/403 |
| 8,029,219 B2 * | 10/2011 | Toutant et al. | ................ | 410/129 |
| 8,070,029 B1 * | 12/2011 | Settle | ............................ | 224/403 |
| 8,100,615 B1 | 1/2012 | Freeborn | | |
| 8,297,896 B2 * | 10/2012 | Draisbach | ..................... | 410/130 |
| 8,371,782 B2 * | 2/2013 | Hill | ............................... | 410/138 |

* cited by examiner

*Primary Examiner* — H Gutman
(74) *Attorney, Agent, or Firm* — Daniel Boudwin; Global Intellectual Property Agency LLC

(57) ABSTRACT

A pickup truck cargo area separator is provided that operably divides the cargo area of a pickup truck into distinct segments using slidably adjustable members. A first member is positioned laterally across a pickup truck cargo area, while a second member slidably connects to the first member to form a T-shaped divider assembly. The T-shaped assembly separates the cargo area into three defined zones. The members are lengthwise adjustable using a telescoping construction and are lockable in a static state once deployed, wherein the members abut against the interior surfaces of the cargo area to remain in place during use. End caps positioned on the lateral member ensure a tight fitment thereof across the cargo bed, while the height of the members act as internal barriers within the cargo area for confining cargo items in specific zones during transport.

13 Claims, 5 Drawing Sheets

CARGO AREA DIVIDER ASSEMBLY

CROSS REFERENCE TO RELATED APPLICATION

This application claims the benefit of U.S. Provisional Application No. 61/739,506 filed on Dec. 19, 2012, entitled "Truck Trunk." The above identified patent application is herein incorporated by reference in its entirety to provide continuity of disclosure.

BACKGROUND OF THE INVENTION

1. Field of the Invention

The present invention relates to pickup truck cargo areas and divider assemblies therefor. More specifically, the present invention pertains to a modular, T-shaped assembly that operably separates the cargo area into two or three distinct zones without requiring tools or a permanent installation.

Pickup trucks are well known vehicles in the art that provide users with the ability to carry bulky items in an open cargo area behind the cab of the vehicle, or further to tow a trailer vehicle therebehind. These vehicles are invaluable to many trades and industries, and also provide individuals with a way to transport or haul items from one location to another with greater ease. Most modern trucks include an open cargo area with raised sides, a tailgate door that allows entry into the cargo area or closure thereof, and various tie down points around the cargo area for securing cargo therein.

One commonly recognized problem in the art that has various solutions is hauling relatively loose articles within an open pickup truck cargo area. During transport, articles that are not sufficiently supported will move around in the cargo area as the vehicle is maneuvering and changes in momentum are imparted into the cargo area items. Many times a user will secure the items using a series of tie-downs or haul loose items within the cab of the vehicle. However this is not always convenient, and given the quantity or relative size of the loose items, hauling the items inside the cab may not be possible.

The present invention is related to an organizational structure that divides the cargo area into distinct zones that can be increased or decreased based on the cargo being hauled. The assembly supports the items within a more confined area such that the items can bear against the assembly during vehicle transport rather than sliding across the cargo area and causing damage to the same or to the items themselves. By breaking down the area and confining articles to a smaller zone, the items can be more statically secured therein or at least preventing from sliding across an entirely open cargo area when being transported.

Various assemblies exist in the art for securing cargo items while being hauled in a pickup truck. While these assemblies may be useful, it is submitted that the present invention provides a more readily adaptable assembly that is easy to install and adjust in the cargo area. The assembly comprises a T-shaped assembly comprised of a first, laterally extending member, and second, longitudinally extending member. The first and second member are operably secured to one another and each may be telescopically adjustable in length, whereby the first member extends across the cargo area and bears into the sides of a pickup truck cargo area, while the second member is extended outward in length to abut against the forward or rear surface of the cargo area. The end caps of the laterally extending first member are simple bumper ends or are used to control the overall length of the member, as provided by the given embodiment disclosed below. The assembly divides the cargo area into either a two-zone configuration or a three-zone configuration, wherein each zone can be resized depending on the cargo for optimal support thereof.

2. Description of the Prior Art

Devices have been disclosed in the prior art that relate to cargo support assemblies and cargo area dividers. These include devices that have been patented and published in patent application publications, and generally relate to sliding barriers that rely on rails or other structure for operation. The devices in the art fail to anticipate a modular, T-shaped divider that can expand or separate while deploying as a cargo area divider. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 6,267,427 to Ziehl, which discloses a pickup truck cargo bed partitioning device that is indexed to the wheel wheels within the cargo bed. The device comprises a planar base positioned between the two wheel wheels, along with at least one partitioning panel that is positioned to the sides of the planar base and hingedly connected thereto. If two partitioning panels are utilized, the panels can be engaged with an attachment strap when the panels are angled upwards via the hinge, whereby the panels rest against the wheel wheels and are secured together across the planar base by the strap. The Ziehl device, while disclosing a novel bed partition, relies on the wheel wheels as a means to stabilize the assembly and to properly function. The preset invention is suited to be setup along either end of the bed for partitioning the same using a T-shaped partition assembly adaptable to fit any sized cargo bed within its extendable limits.

Another device in the prior art is U.S. Pat. No. 6,827,533 to Cano-Rodriguez, which discloses a cargo retention device and method for retaining cargo in the bed of a pickup truck that comprises a first and second extension member that form a T-shaped device. The members are extended outward to secure against the inner walls of the cargo bed of the truck, whereby the assembly can be locked into place to reduce the open area in the cargo bed. This acts to retain articles in the bed that do no consume its entire area, thereby preventing shifting of the same. Several accessories are provided, along with different embodiments of the extension members. However, the Cano-Rodriguez device is only adapted to operate in a single vertical plane. The present invention is adapted to create a first and second partition using a single cross member and a perpendicular member that forms an extendable T-shape cargo divider.

U.S. Pat. No. 6,206,624 to Brandenburg is another device that discloses a cargo space divider for the bed of a pickup that partitions the bed into smaller segments using suspended sectional walls that span the width of the bed. The sectional walls are suspended from support rails that rest on the upper rails of the cargo bed and extend laterally thereacross. Longitudinal sectional walls are utilized between pairs of laterally disposed sectional walls to further subdivide the cargo area as necessary. While providing a potentially T-shaped partitioning assembly, the Brandenburg assembly is comprised of elements that diverge in design and application. The present invention rests along the bed of the cargo area and is extended to bear into the sidewalls thereof, while the Brandenburg device is supported by the upper rails of the cargo area and extends the partitions downward.

Similar to the Brandenburg device is U.S. Pat. No. 6,629,807 to Bernardo and U.S. Pat. No. 8,100,615 to Freeborn. The Bernardo device comprises a cargo barrier that is slidable relative to the front and back of the cargo bed of a pickup truck by way of a track system that spans the upper rails of the cargo bed. A divider is slidably positioned along the track system to partition the cargo area into smaller areas. The Freeborn device provides a similar structure that comprises a sliding gate that is positionable across a cargo area of the pickup truck, whereby the gate is supported by slide rails. The structural arrangement is different from Bernardo; however the concept is the same. A cargo divider is slidably positioned along side rails in the cargo area.

The present invention contemplates a T-shaped partition that is placed along the bed of a pickup truck cargo area, whereby the partition includes extendable members that are adapted to expand to the dimensions of the given cargo area. The assembly utilizes a first member that functions as a main cross member across the cargo area. The first member includes a tongue and groove arrangement with a perpendicular second member that functions as a secondary partition member, whereby the second member is slidable therealong and lockable in a desired location along the cross member groove. End cap members on the first member and the perpendicular second member allow the assembly to bear against the truck bed interior without causing damage thereto, while retaining the position of the assembly therein while segregating cargo.

It is submitted that the present invention is substantially divergent in design elements from the prior art, and consequently it is clear that there is a need in the art for an improvement to existing cargo area divider assemblies. In this regard the instant invention substantially fulfills these needs.

SUMMARY OF THE INVENTION

In view of the foregoing disadvantages inherent in the known types of pickup truck cargo area dividers, partitions, and tie down systems now present in the prior art, the present invention provides a new divider system that can be utilized for providing convenience for the user when operably partitioning the cargo area of the pickup using a T-shaped assembly resting on the bed thereof.

It is therefore an object of the present invention to provide a new and improved cargo area divider assembly that has all of the advantages of the prior art and none of the disadvantages.

It is another object of the present invention to provide a cargo area divider assembly that includes a first and second member forming a T-shaped assembly that partitions the cargo area of a pickup truck into at least two distinct zones.

Another object of the present invention is to provide a cargo area divider assembly that is extendable such that the assembly can be deployed on any sized truck cargo area and partition the same.

Yet another object of the present invention is to provide a cargo area divider assembly that requires no tools to install and can readily be removed and stowed when not required.

Another object of the present invention is to provide a cargo area divider assembly that utilizes a first member in a removably slidable connection with a second member, wherein the connection comprises a tongue and groove attachment.

Another object of the present invention is to provide a cargo area divider assembly that can be locked into a static position in the cargo area and is stabilized by bearing into the cargo area upstanding surfaces for support.

Another object of the present invention is to provide a cargo area divider assembly that does not require alteration of the existing cargo area or any installation elements therein prior to deployment.

A final object of the present invention is to provide a cargo area divider assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
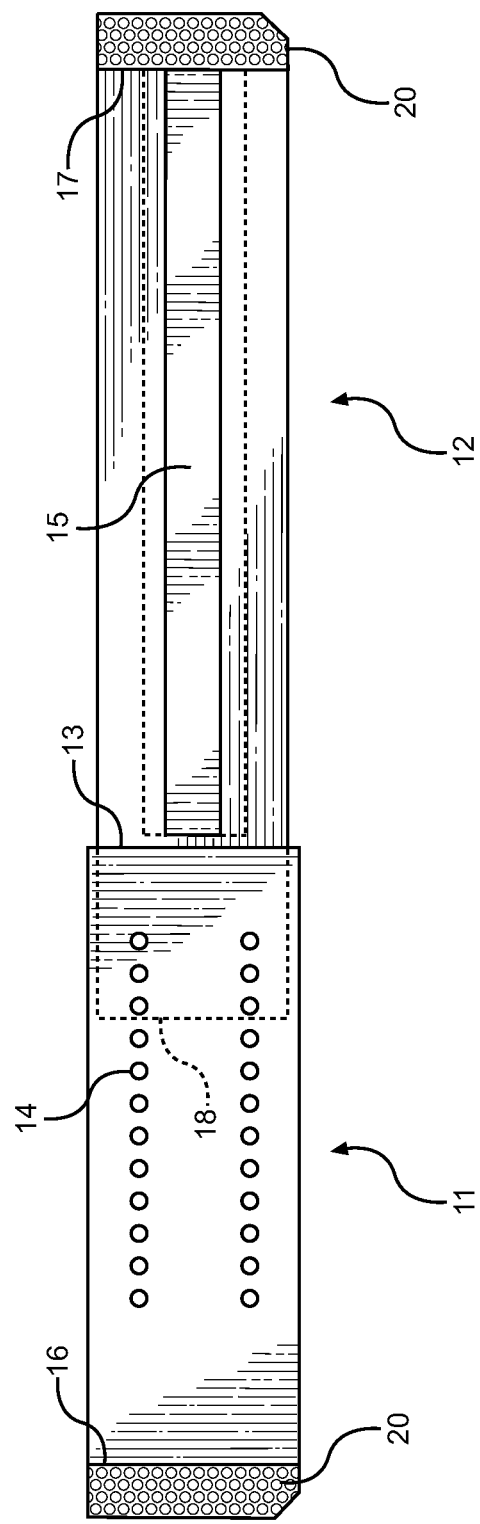
FIG. 1 shows an embodiment of the first member of the present divider assembly, which acts as the main cross member disposed across the cargo area.

Reference is made herein to the attached drawings. Like reference numerals are used throughout the drawings to depict like or similar elements of the pickup truck cargo area divider assembly. For the purposes of presenting a brief and clear description of the present invention, two embodiments will be discussed as used for partitioning a pickup truck cargo area into smaller, discrete zones for containment of smaller articles or loose cargo items therein. The figures are intended for representative purposes only and should not be considered to be limiting in any respect.

Referring now to FIG. 1, there is shown a side view of the laterally extending first member of the cargo area divider system of the present invention. The first member acts as a main cross member adapted to be placed laterally across a pickup truck bed (or longitudinally, depending on user choice), wherein a second, perpendicular member engages the first member to form a T-shaped assembly. The first member comprises an elongated length having a first 11 and second 12 portion in telescopic relationship with one another to operably control the elongated length of the first member. The first portion 11 comprises an elongated, open-interior portion having a closed outer end 16 and an open interior end 13 that is adapted to accept the second portion 12 therein. Along the length of the first telescopic portion 11 is a purity of fastener locations 14 therealong. The fastener locations 14 are adapted to accept a pin or dowel therethrough for securing the first telescopic portion 11 to the second telescopic portion 12, securing the two together to achieve a given overall member length that is fixed in nature.

The second telescopic portion 12 comprises an elongated length that is adapted to fit within the open first portion 11. Along the side of the second telescopic portion 12 is an elongated groove 15 that extends from the outer end 17 thereof and up to the interior end 18. The groove 15 is adapted to accept the tongue of the perpendicular second member therein such that the two are in a sliding relationship. Along the length of the second portion 12 is at least one fastener hole extending therethrough (not shown). This hole is adapted to align with the fastener holes 14 of the first telescopic member such that a pin can be slid therethrough to secure the first and second telescopic portions in a static state while deployed.

Along the outer ends 16, 17 of the first member are end caps 20 that are comprised of a compressible material. The end caps 20 are utilized to fill the gap between the ends of the first member and the sides of the cargo area, wherein the extended length of the first member can be fixed to be just short of the cargo area width. The end caps 20 are compressed between the side surfaces of the cargo area and the first and second portion outer ends 16, 17 such that the laterally extending first member is firmly positioned therebetween and will not readily move during transport. The caps 20 are fastened to the ends of the first member and prevent the ends from scratching against the walls of the cargo area when in use.

Figure 2:
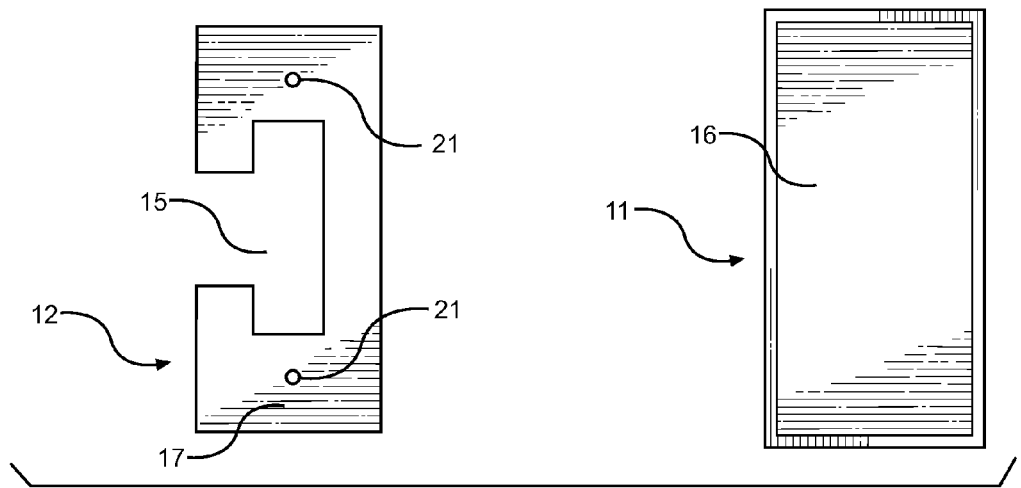
FIG. 2 shows end views of the two telescopic portions of the first member, wherein the first includes a groove and the second is open ended to accept the first portion therein.

Referring now to FIG. 2, there are shown end views of the first 11 and second 12 laterally telescoping portion and the first member. The first portion 11 comprises a rectangular cross section with an open interior 16 adapted to accept therein the second portion 12. The first portion 11 comprises a pair of sidewalls, a base surface, an upper surface, and an outer end wall defining the open interior 16. The second portion 12 comprises a solid member 17 having an elongated groove or channel 15 extending therealong. The groove 15 is adapted to secure the tongue of the perpendicular member and allow slidable positioning thereof relative to the second portion 12. The outer ends of both the first 11 and second 12 portion also include fastener holes 21 to accommodate the fasteners of the end caps.

Figure 3:
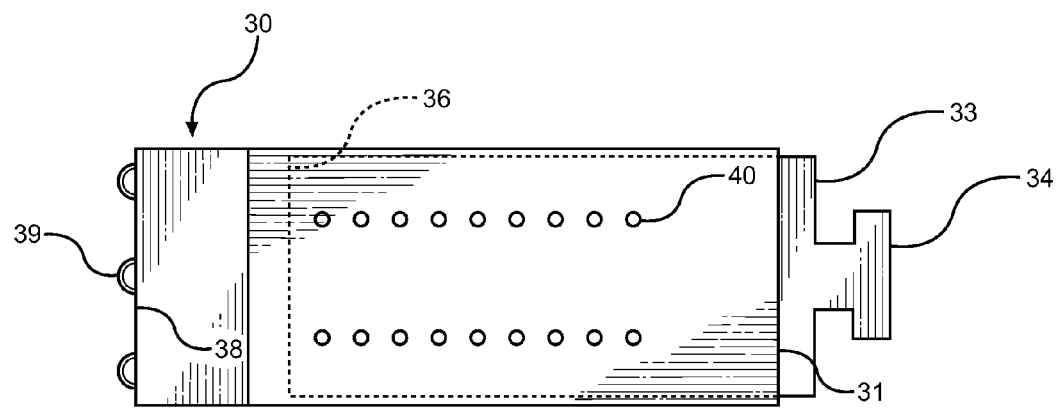
FIG. 3 shows side and overhead views of the second member of the divider assembly, wherein the second member is a perpendicular partition slidably connected to the first member.
Figure 3:
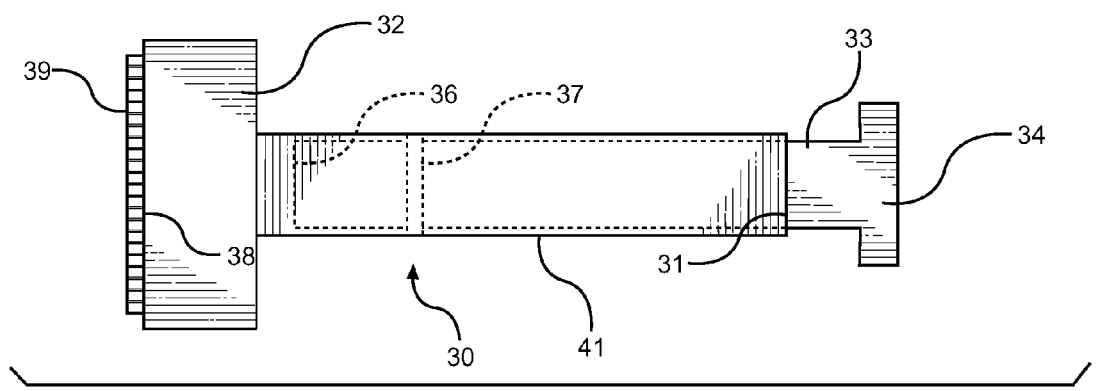

Referring now to FIG. 3, there is shown a side view and overhead view of the perpendicular member 30 of the present invention. The perpendicular member 30 comprises a first end that includes an outwardly extending tongue element 34, and a second end 38 that extends outward to provide a widened end 32. The tongue element 34 is designed to be accepted by the groove of the second portion of the laterally extending member, while the widened end 32 is adapted to bear against an interior surface of the cargo area. This end may include cushioning elements 39, bumper elements, or end caps as provided on the laterally extending member. Furthermore, the construction of the perpendicular member 30 may take on two forms: a length adjustable form and a static form.

The length adjustable form of the perpendicular member is shown in FIG. 3 and comprises a pair of perpendicular telescoping portions. As provided in the laterally extending member, a first perpendicular portion 33 is accepted into the open interior of a second perpendicular portion 41 to allow the two portions to slide relative to one another and be fastened 37 together via aligned fastener holes 40. The end 31 of the first telescoping member is open and accepts the end 36 of the second telescoping member, wherein the two are in a sliding relationship to dictate the overall length of the perpendicular member 30.

Figure 4:
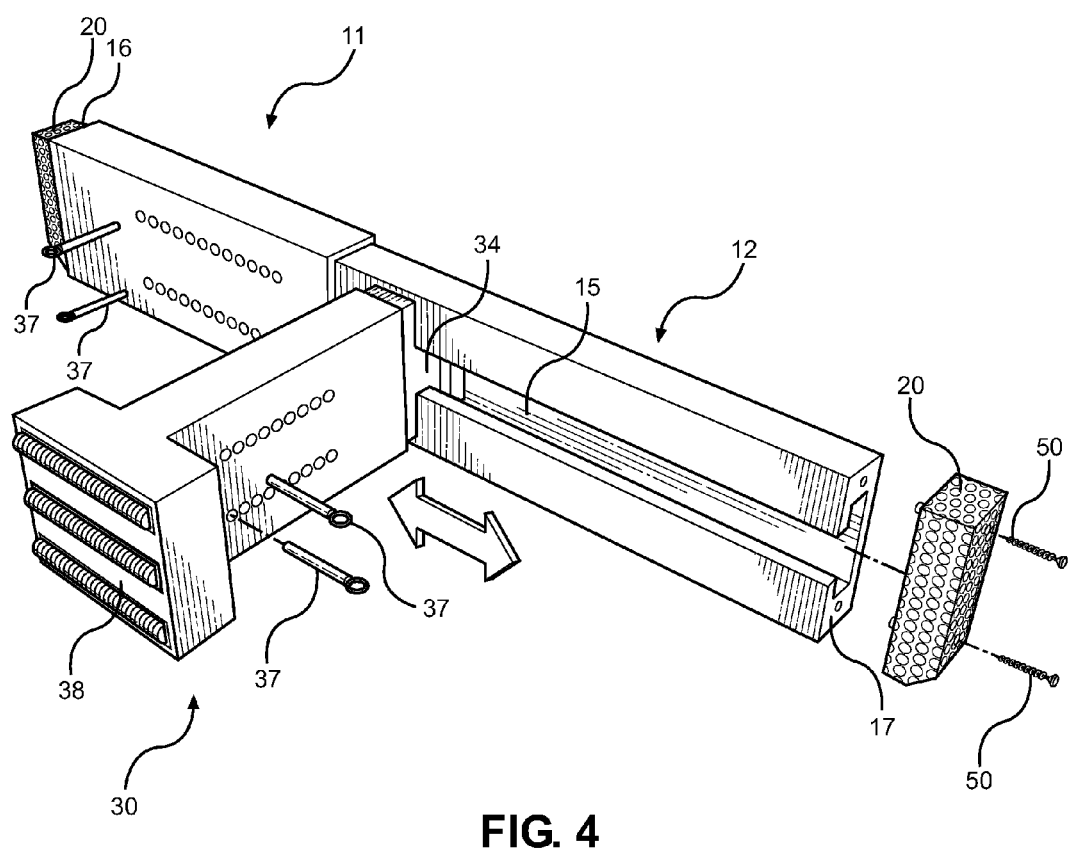
FIG. 4 shows the first contemplated embodiment of the divider assembly of the present invention in a working state, along with one of the member end caps in an exploded state.

Referring now to FIG. 4, there is shown a perspective view of the complete assembly, wherein the first embodiment of the present invention is illustrated. The laterally extending member, comprising of the first portion 11 and second portion 12, is connected to the perpendicular member 30 to form a T-shaped divider. The tongue element 34 of the perpendicular member 30 is secured within the channel 15 of the laterally extending member, and the length of both the telescoping perpendicular member and laterally extending member is fixed using a plurality of fasteners 37, pins, or dowels. When installed within a cargo area, the length of each member is extended outward toward the interior surfaces thereof. The lengths are fixed, wherein the ends 17, 16, 38 of the assembly are abutted against or positioned adjacent to the cargo area interior surfaces. The fastened 50 end caps 20 and the cushioning elements are used to provide a secure fitment and prevent marring of the cargo area interior surfaces.

Figure 5:
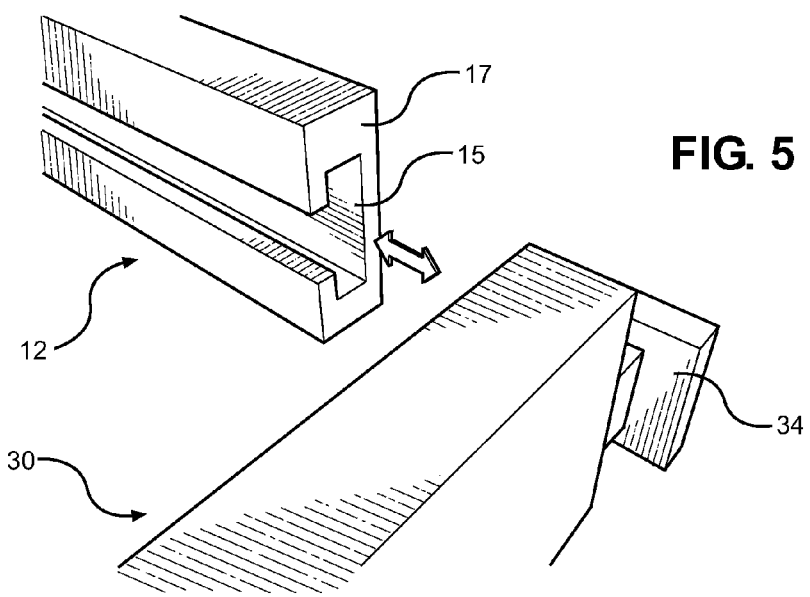
FIG. 5 illustrates the tongue and groove connection between the first and second member of the divider assembly.
Figure 6:
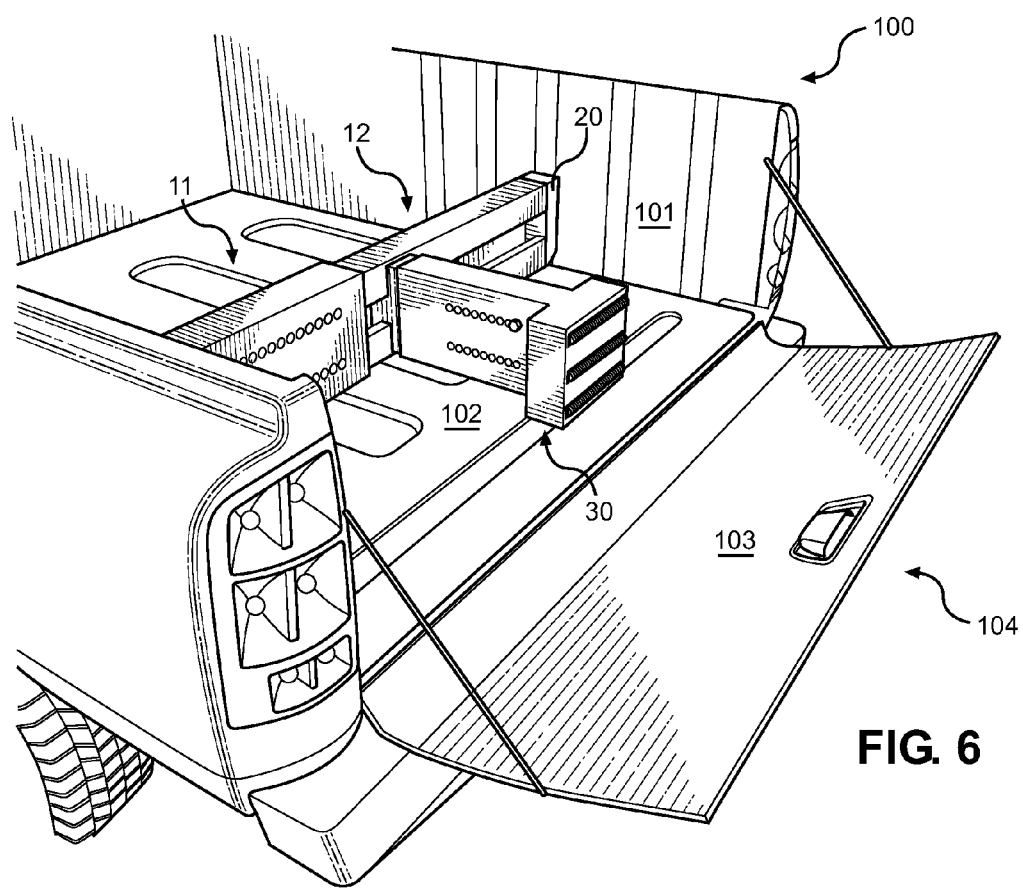
FIG. 6 shows the divider assembly in a working state, deployed along the bed of a pickup truck cargo area to partition the same into three distinct zones.

Referring now to FIG. 5, there is shown a view of the connection between the laterally extending member and the perpendicular member. The user has the option of deploying the present invention as a single divider (i.e. the laterally extending first member only), or alternatively as a T-shaped divider assembly by connecting the laterally extending first member to the perpendicular second member. When installed, the sidewall surfaces of the members provide an upstanding barrier against moving cargo, wherein the cargo can be placed into a space within the cargo area that has been subdivided into smaller areas by the assembly.

As shown in FIG. 5, the contemplated connection between the two members is a tongue and groove, slidable attachment. The tongue member 34 of the perpendicular member 30 slides into the channel 15 of the laterally extending member via its outer end 17. The channel 15 extends through the outer end 17 such that the two members can be coupled together and the perpendicular member can slide freely within the channel 15 thereafter.

Referring to FIG. 5, there is illustrated a view of the first embodiment of the present invention in a working state. The first 11 and second portions 12 of the laterally extending first member are fixed to one another, while the end caps 20 thereof bear against the upstanding walls 101 of the vehicle cargo area 100. The perpendicular member 30 extends from the laterally extending first member, wherein both rest upon the base surface 102 of the cargo area. The outer end of the perpendicular member is adapted to abut against the cargo door 104 interior surface 103 when the door 104 is in a closed state. This separates the cargo area 100 into three distinct zones. The user has the option of removing the perpendicular second member to divide the cargo area 100 into two distinct zones, if desired.

Figure 7:
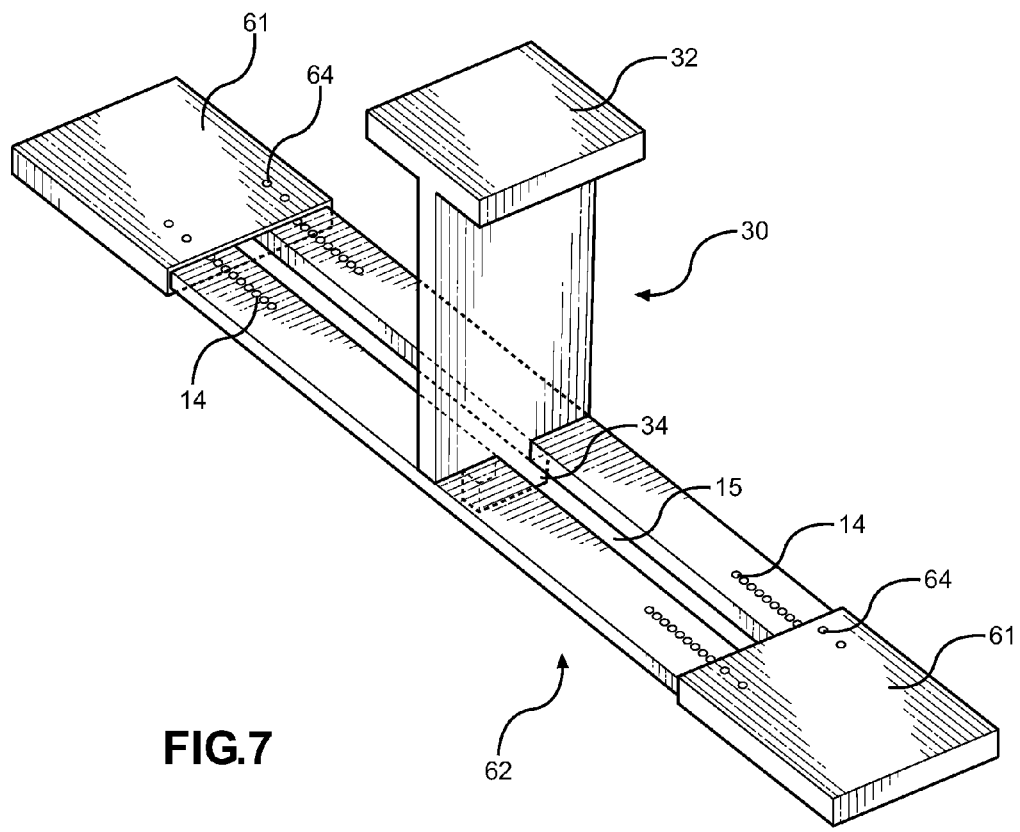
FIG. 7 shows a perspective view of a second embodiment of the divider assembly of the present invention.
Figure 8:
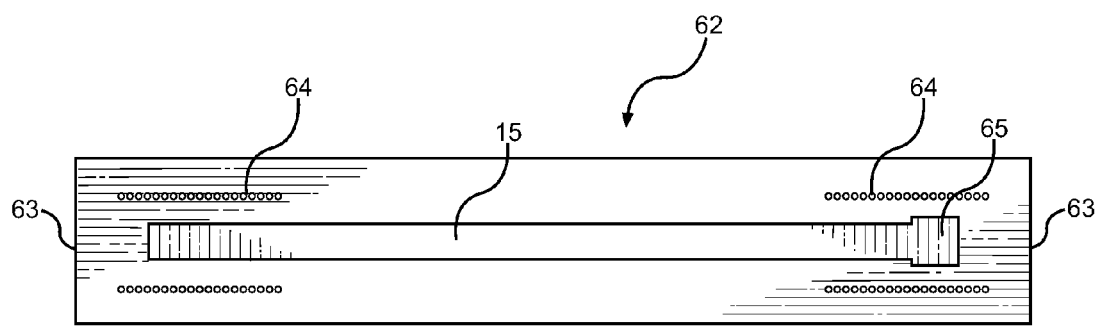
FIG. 8 shows a view of the elongated divider wall of the second embodiment of the present invention.

Referring now to FIGS. 7 and 8, there is shown a second embodiment of the present invention. In this embodiment, the laterally extending first member 62 comprises a fixed length and a unitary structure. The length adjustment of this member 62 is accomplished using a first and second slidable end member 61, which are in a slidable and telescoping relationship with the first member 62. The end members 61 are fixed thereto via fasteners or pins placed through aligned fastener holes 64, 14 in the first member 62 ends and the end members 61 themselves.

The second embodiment of the first member 62 comprises an elongated channel 15 in the same manner as the first embodiment, wherein the tongue member 34 of a perpendicular member 30 is accepted therein. The channel 15 extends to the ends 63 of the first member 62 or alternatively terminates at a widened channel area 65 adapted to allow the tongue to be freely removed from the channel 15. This widened channel area 65 is preferably positioned along the end or ends 63 of the first member 62, wherein the end members 61 secure over the widened channel area 65 while the assembly is in use. This prevents the tongue member 34 from exiting the channel 15 while the end members 61 are attached to the first member 62. The end members 61 comprise an open end, an enclosed outer end, and an interior volume adapted to accept one end 63 of the first member 62 therein. The end members 61 are slidable with respect to the first member 61 and are fixed thereto, establishing the overall length of the assembly across the cargo area.

Vehicles, such as trucks and cargo vans are useful for transporting large items that will not fit within a conventional vehicle. Users of such vehicles often experience items sliding around in the bed during transit. It can be very difficult to keep items organized in this situation, causing a user to spend unnecessary time sorting through things upon arrival. Furthermore, the items may fall over or collide, either of which can result in breakage and other damage thereto. Overall, the present invention provides an apparatus to prevent cargo from sliding in the cargo area of a vehicle. The assembly comprises two embodiments that include telescoping members that spans the width of the cargo area and include a perpendicular member to divide the cargo area into three distinct zones using a T-shaped assembly. The assembly sections off a portion of the pickup truck bed, which helps to secure cargo contained therein. The assembly adjusts to suit beds and loads of various sizes, and enables fast, simple installation and removal thereof.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cargo area divider assembly, comprising:
   a laterally extending first member;
   a perpendicular second member;
   said laterally extending first member comprised of a first laterally telescoping portion and a second laterally telescoping portion in telescoping relationship;
   said first laterally telescoping portion having an open interior adapted to accept said second laterally telescoping portion therein;
   said first laterally telescoping portion and a second laterally telescoping portion adapted to allow for length adjustment of said laterally extending first member;
   said second laterally telescoping portion having an elongated length and a channel extending along said elongated length;
   said perpendicular second member having an outer end and an inner end, said inner end comprising an outwardly extending tongue element;
   said tongue element adapted to secure within said channel and be slidably positionable therein along said elongated length of said second portion;
   said perpendicular second member further comprises a first perpendicular telescoping portion and a second perpendicular telescoping portion;
   said first perpendicular telescoping portion comprising an open interior adapted to accept said second perpendicular telescoping portion therein;
   said first perpendicular telescoping portion and a second perpendicular telescoping portion adapted to allow for length adjustment of said perpendicular second member.

2. The cargo area divider assembly of claim 1, wherein:
   said first perpendicular telescoping portion and said second perpendicular telescoping portion comprise alignable fastener holes and at least one fastener for securing said first perpendicular telescoping portion and second perpendicular telescoping portion in a fixed state.

3. The cargo area divider assembly of claim 1, wherein:
   said first laterally telescoping portion and said second laterally telescoping portion comprise alignable fastener holes and at least one fastener for securing said first laterally telescoping portion and second laterally telescoping portion in a fixed state.

4. The cargo area divider assembly of claim 1, wherein:
   said laterally extending first member further comprises a first end and a second end;
   an end cap member secured to said first end and said second end.

5. The cargo area divider assembly of claim 1, wherein:
   said outer end of said perpendicular second member further comprises a widened end.

6. The cargo area divider assembly of claim 1, wherein:
   said outer end of said perpendicular second member further comprises cushioning elements.

7. A cargo area divider assembly, comprising:
   a laterally extending first member having a first end and a second end;
   a perpendicular second member;
   said laterally extending first member comprising an elongated length and a channel extending along said elongated length;
   a first and second end member adapted to be slidably positionable over said first end and said second end, respectively, of said laterally extending first member in a telescoping relationship;
   said first and second end member adapted to allow for length adjustment of said laterally extending first member;
   said perpendicular second member having an outer end and an inner end, said inner end comprising an outwardly extending tongue element;
   said tongue element adapted to secure within said channel and be slidably positionable therein along said elongated length of said laterally extending first member.

8. The cargo area divider assembly of claim 7, wherein:
   said channel extends through to said first end and said second end of said laterally extending first member;
   said first and second end member adapted to partially shroud said channel along said first end and a second end of said laterally extending first member.

9. The cargo area divider assembly of claim 7, wherein:
said channel terminates at a widened channel area adapted to allow said outwardly extending tongue element of said perpendicular second member to freely enter and be removed from said channel;
said first and second end member adapted to shroud said widened channel area.

10. The cargo area divider assembly of claim 7, wherein:
said perpendicular second member further comprises a first perpendicular telescoping portion and a second perpendicular telescoping portion;
said first perpendicular telescoping portion comprising an open interior adapted to accept said second perpendicular telescoping portion therein;
said first perpendicular telescoping portion and a second perpendicular telescoping portion adapted to allow for length adjustment of said perpendicular second member.

11. The cargo area divider assembly of claim 9, wherein:
said first perpendicular telescoping portion and said second perpendicular telescoping portion comprise alignable fastener holes and at least one fastener for securing said first perpendicular telescoping portion and second perpendicular telescoping portion in a fixed state.

12. The cargo area divider assembly of claim 7, wherein:
said laterally extending first member and said first and second end member comprise alignable fastener holes and at least one fastener for securing said first and second end member to said laterally extending first member in a fixed state.

13. The cargo area divider assembly of claim 7, wherein:
said outer end of said perpendicular second member further comprises a widened end.

* * * * *